(12) United States Patent
Singh et al.

(10) Patent No.: US 8,817,701 B2
(45) Date of Patent: Aug. 26, 2014

(54) METHOD AND SYSTEM FOR SELF-ENABLING PORTABLE TELEVISION BAND DEVICES

(75) Inventors: Harkirat Singh, Santa Clara, CA (US); Ju-Lau Hsu, Saratoga, CA (US); Su Khiong Yong, Santa Clara, CA (US); Chin Ngo, San Francisco, CA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 492 days.

(21) Appl. No.: 12/821,032

(22) Filed: Jun. 22, 2010

(65) Prior Publication Data

US 2011/0310253 A1     Dec. 22, 2011

(51) Int. Cl.
*H04W 4/00*     (2009.01)
*H04W 88/08*     (2009.01)

(52) U.S. Cl.
CPC ..................................... *H04W 88/08* (2013.01)
USPC .......................................................... 370/328

(58) Field of Classification Search
CPC .................................................... H04W 88/08
USPC .......................................................... 370/328
See application file for complete search history.

(56) References Cited

U.S. PATENT DOCUMENTS

| | | | | |
|---|---|---|---|---|
| 2001/0048687 | A1* | 12/2001 | Coden ............................ | 370/403 |
| 2008/0160916 | A1* | 7/2008 | Jagger et al. .................. | 455/63.1 |
| 2010/0138385 | A1* | 6/2010 | Palermiti et al. .............. | 707/610 |
| 2010/0255794 | A1* | 10/2010 | Agnew ............................ | 455/77 |
| 2011/0158147 | A1* | 6/2011 | Li et al. .......................... | 370/312 |
| 2011/0194503 | A1* | 8/2011 | Stanforth ....................... | 370/329 |
| 2011/0287802 | A1* | 11/2011 | Ma et al. ......................... | 455/517 |
| 2012/0026941 | A1* | 2/2012 | Ahmad et al. ................. | 370/328 |
| 2012/0096498 | A1* | 4/2012 | Wu et al. ......................... | 725/81 |

OTHER PUBLICATIONS

IEEE Computer Society, "IEEE Std 802.11y™—2008, IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 3: 3650-3700 MHz Operation in USA", IEEE, Nov. 6, 2008, pp. i-74, New York, United States.

IEEE Computer Society, "IEEE Std 802.11™—2007 (Revision of IEEE Std 802.11-1999 ), IEEE Standard for Information technology—Telecommunications and information exchange between systems—Local and metropolitan area networks—Specific requirements, Part 11: Wireless LAN Medium Access Control (MAC) and Physical Layer (PHY) Specifications", IEEE, Jun. 12, 2007, pp. i-1184, New York, United States.

Federal Communications Commission (FCC), "FCC 08-260 Second Report and Order", FCC, Nov. 14, 2008, pp. 1-130, United States, http://hraunfoss.fcc.gov/edocs_public/attachmatch/FCC-08-260A1.pdf (last visited May 4, 2011).

\* cited by examiner

*Primary Examiner* — Mark Rinehart
*Assistant Examiner* — Christopher R Crompton
(74) *Attorney, Agent, or Firm* — Kenneth L. Sherman, Esq.; Michael Zarrabian, Esq.; Sherman & Zarrabian LLP

(57) ABSTRACT

Embodiments of the invention provide a method and system for determining wireless channel interference in a television (TV) band white space spectrum. Upon sensing a signal on a wireless channel from a wireless white space device that transmits a unique device identifier, interference by the wireless white space device on the wireless channel is determined. A report of the channel interference by the wireless white space device is generated and may be utilized to cease the interference.

44 Claims, 5 Drawing Sheets

| Geolocation | MAC Address | Channel(s) Number | BSSID | Authentication code from geolocation database | Higher layer identifiers | | | |
|---|---|---|---|---|---|---|---|---|
| | | | | | Default DNS | Subnet mask and IP | Default GW | Port number |

METHOD AND SYSTEM FOR SELF-ENABLING PORTABLE TELEVISION BAND DEVICES

FIELD OF THE INVENTION

The present invention relates generally to white space spectrum communication, and more specifically, to television (TV) white space spectrum (TVWS) communication networks.

BACKGROUND OF THE INVENTION

The opening of the television (TV) bands in the United States presents an opportunity for secondary spectrum utilization. In order to successfully utilize TV white space spectrum (TVWS), it is necessary to provide sufficient protection to primary or incumbent devices. Thus, different requirements are mandated for fixed and portable TV white space devices. One difference is that a portable device capable of accessing geolocation databases, such as a fixed device, is not required to register with the geolocation database. In such scenarios, it becomes difficult to pin-point a source of interference.

BRIEF SUMMARY OF THE INVENTION

Embodiments of the present invention provide a method and system for determining wireless channel interference in a white space spectrum. Upon sensing a signal on a wireless channel from a wireless white space device that transmits a unique device identifier, interference by the wireless white space device on the wireless channel is determined. A report of the channel interference by the wireless white space device is generated and may be utilized to cease the interference.

These and other features, aspects and advantages of the present invention will become understood with reference to the following description, appended claims and accompanying figures.

BRIEF DESCRIPTION OF THE DRAWINGS

FIG. 2 shows a signature format including a unique device identifier, according to an embodiment of the invention.

DETAILED DESCRIPTION OF THE INVENTION

Embodiments of the present invention provide a method and system for determining wireless channel interference in a white space spectrum. Upon sensing a signal on a wireless channel from a wireless white space device that transmits a unique device identifier, interference by the wireless white space device on the wireless channel is determined. A report of the channel interference by the wireless white space device is generated and may be utilized to cease the interference.

Figure 1:
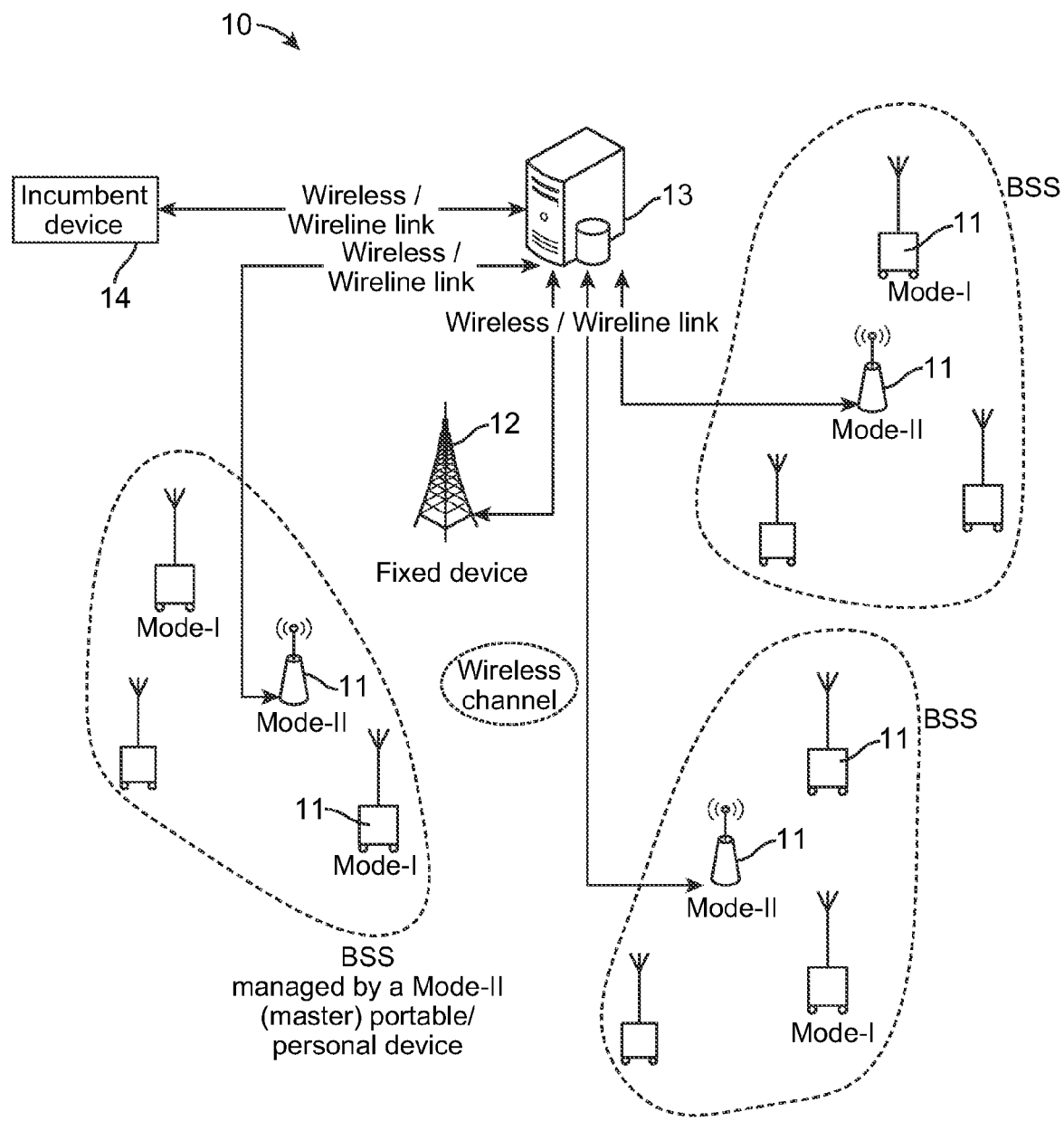
FIG. 1 shows a network of wireless TV white space electronic devices, implementing channel interference detection and prevention, according to an embodiment of the invention.

FIG. 1 illustrates a diagram of a network 10 of wireless TV white space electronic devices 11 and 12, according to an embodiment of the invention. A white space device comprises a certified wireless device (wireless stations) that may operate without an exclusive broadcast license in the radio frequency (RF) spectrum below a certain frequency (e.g., 700 MHz). White space devices can access the Internet at wireless broadband speeds, using underutilized portions of the radio frequency spectrum known as white space.

Typically there are two categories of white space devices. A first category of white space device comprises a low-power wireless personal/portable white space device 11 that will function similar to WiFi transceivers and wireless local area network (WLAN) devices based on the IEEE 802.11 standards. A second category of white space device comprises a higher-powered fixed/access white space device 12, typically operating from a fixed location. Fixed white space devices are allowed into the TV spectrum.

A personal/portable white space device (WSD) 11 is either in Mode-I, under the control of a fixed device or a personal/portable device that employs geolocation database access and spectrum sensing, or in Mode-II wherein the personal/portable device 11 is a master device that employs geolocation database access and spectrum sensing itself.

Personal/portable white space devices 11 operating in either mode sense signals such as TV signals, wireless microphone signals, and signals of other services that operate in the TV bands, including those that operate on intermittent basis, at levels as low as −114 dBm. Personal/portable devices 11 are not required to register with a geolocation database system. As such, the requirements for personal/portable devices 11 are as follows:

Personal/portable device 11 (Mode-I)
  100 mW/40 mW.
  Under control of Fixed or personal portable device capable of self-enablement (Mode-II).
  No need to register with the geolocation database.
Personal/portable device capable of self-enablement 11 (Mode-II)
  100 mW/40 mW.
  Access to Internet.
  Access to geolocation database.
  No need to register with the geolocation database.

Embodiments of the invention provide a method and system for self-enabling a personal/portable TV band white space device 11. One embodiment comprises a process for identifying sources of interference from TV White space spectrum (TVWS) personal/portable master devices 11 (Mode-II) in which each such master device transmits a signature comprising a combination of identifiers from multiple communication layers and geolocation data. As noted, a personal/portable device 11 operates in Mode-II (as a master device) by employing geolocation database access and spectrum sensing itself. A Mode-II personal/portable device 11 manages a Basic Service Set (BSS).

The master personal/portable device (Mode-II) is capable of self-enablement and periodically, or on-demand, transmits said signature identifying its unique identity. This allows a primary/secondary white space device to request an interfering personal/portable white space device (Mode-II) to cease operation by contacting the interfering personal/portable white space device in-band on an operating channel or on layers above a data link layer in the Transmission Control Protocol/Internet Protocol (TCP/IP) model for layered communications and computer network protocol.

Layers in the TCP/IP model include, from highest to lowest: Application Layer (layer 4), Transport Layer (layer 3), Network/Internet Layer (layer 2), Link Layer comprising physical and data link sub-layers (layer 1). The TCP/IP layers can be loosely mapped to the Open System Architecture (OSI).

A primary/secondary device may be a fixed device 12 or a portable/personal device 11. A fixed device 12 employs both access to a geolocation database 13 and spectrum sensing capabilities that enable the fixed device to listen for and identify the presence of signals from other wireless transmitters.

Device Signature (Identifier)

According to an embodiment of the invention, a personal/portable device 11 (Mode-II) that is capable of self-enablement includes a unique signature comprising an identifier that uniquely identifies the personal/portable device 11 among other available personal/portable devices. Should any interference to licensed services (i.e., primary users) occur, the unique signature assists in the identification of the source white space device of any such interference.

A fixed device 12 registers its location with the geolocation database 13, however, this requirement is relaxed in the case of personal/portable devices 11. FIG. 2 illustrates a signature format 20 for a personal/portable device 11, according to an embodiment of the invention. As shown in FIG. 2, the personal/portable device signature 20 may include the following information for operation of the personal/portable device 11 according to an embodiment of the invention:

Geolocation: Geolocation coordinates of the device.
MAC Address: Media Access Control (MAC) address of the device.
Channel(s) number: Wireless channel number(s) that are used by the device.
BSSID/SSID: Basic service set identifier (BSSID) and/or service set identifier (SSID) of the device.
Authentication code from Geolocation database: The personal/portable device capable of self-enablement (Mode-II) may report the wireless channel being used by the personal/portable device to the geolocation database, and the geolocation database returns an authentication code. Alternatively, the geolocation database provides an authorization code indicating that the personal/portable device indeed has access to the Geolocation database.
Higher layer identifiers:
Default domain name system (DNS) of the device.
Subnet mask and Internet Protocol (IP) of the device.
Default Gateway (GW) of the device.
Port number over which the device is listening for any request related to its operation in TVWS, etc.

A personal/portable device 11 that is capable of self-enablement (Mode-II) queries (contacts) the geolocation database 13 via the Internet to obtain a list of available wireless channels at its location in accordance with the rules set by an administrator of the geolocation database 13. The query may return a list of wireless channels and authentication codes from the geolocation database 13. In addition, channel sensing may be used to determine the occupancy of a wireless channel.

At this stage, the personal/portable device 11 that is capable of self-enablement (Mode-II) can proceed with the formation of a TVWS network on an identified (selected) channel. The personal/portable device 11 may periodically access (or query) the database 13 and/or perform channel sensing to validate the continuous availability of the channel.

The personal/portable device 11 periodically transmits the unique signature during an initial channel claiming period and during periodic channel re-claiming periods. In addition, the device 11 periodically transmits the unique signature when it determines that its physical location has changed and may be identified by a combination of one or more parameters including its geolocation, IP address, default (GW) address, BSSID, etc.

The personal/portable device 11 may transmit the signature by including it in a beacon or any other management frames transmitted by the personal/portable device. Alternatively, one or more fields in the device identifier 20 are transmitted on a higher layer such as network or IP-Layer (TCP/IP layer 2), Transport or TCP-Layer (TCP/IP layer 3), Application Layer (layer 4), etc.

In this case, the device identifier can optionally include Regulatory class and Channel Number fields. The Regulatory Class and Channel Number fields together specify the channel frequency and channel bandwidth for which the device identifier applies. However, these fields are not required otherwise when device identifiers are transmitted in-band.

In yet another embodiment, a personal/portable device 11 (Mode-I) which is already enabled by a personal/portable device capable of self-enablement (Mode-II), or by a fixed device 12, can transmit its device signature 20 periodically, or on-demand. Since Mode-I personal/portable devices 11 are not expected to have both geolocation and Internet access, in some cases such Mode-I devices 11 may not have complete information to populate all fields in their device identifier 20.

For example, a personal/portable device 11 (Mode-I) may not be able (incapable) to populate geolocation and other higher layer fields. In this case, the personal/portable device 11 (Mode-I) can populate these fields by using corresponding information from the device identifier 20 of its enabling device. The device identifier 20 shown in FIG. 2 may include a flag to indicate this operation. Furthermore, Mode-I devices 11 may as well send a partial or complete device identifier on higher layers.

Device Protection

According to embodiments of the invention, incumbent (or primary device) protection is provided using a primary/secondary device, as follows.

By Peer Personal/Portable Device (Mode-II) or a Fixed Device

A peer personal/portable device 11 capable of self-enablement (Mode-II) or a fixed device 12 detects a transmission on an unavailable channel and reports the interference to a reporting authority with the appropriate data including the signature of the interfering personable/portable device 11 capable of self-enablement (Mode-II).

By Incumbent Device

A wireless incumbent device 14 (FIG. 1) behaves as a peer personal/portable device 11 capable of self-enablement (Mode-II) or a fixed device 12. In some cases, the incumbent device may not be able to decode a packet transmitted on an unavailable channel, but can report interference to the geolocation database 13 (as per a database administrator) and a reporting authority may take a corrective action.

For example, all personal/portable devices capable of self-enablement (Mode-II) creating interference on a particular channel in the vicinity of the reporting incumbent device are advised by the reporting authority to go off channel.

According to embodiments of the invention, a personal/portable device 11 capable of self-enablement (Mode-II) can transmit the device identifier multiple times on narrowband/ wideband wireless channel as used by incumbent devices. For example, a microphone may operate over 100 KHz channel but the personal/portable device is transmitting over a wideband channel such as over 6 MHz.

As such, in one implementation, the personal/portable device 11 can transmit the unique signature multiple times over the narrowband channel. Since it is not known ahead of time on which narrowband channel an incumbent device is present, or whether it can receive on both narrowband and wideband channels, the personal/portable device capable of self-enablement (Mode-II) can in one implementation transmit on all narrowband channels masked within a particular wideband channel. As those skilled in the art will recognize, another scheme can be used to transmit.

In another embodiment of the invention, after claiming a channel, the personal/portable device 11 capable of self-enablement (Mode-II) registers its device identifier with a fixed device or any other authorized entity. To reduce the length of device identifier, the fixed device or any other authorized entity may compute a hash of fixed length bits over the signature. Instead of transmitting the full device identifier, the personal/portable device capable of self-enablement (Mode-II) may include the hash value.

In another embodiment, the portable device 11 capable of self-enablement (Mode-II) may transmit a tuple including its hash value together with the device identifier of the fixed device or any other authorized entity {hash, device identifier, fixed device or any other authorized entity id}. In another embodiment, all devices can independently compute this hash value based on an agreed upon hashing function.

Figure 3:
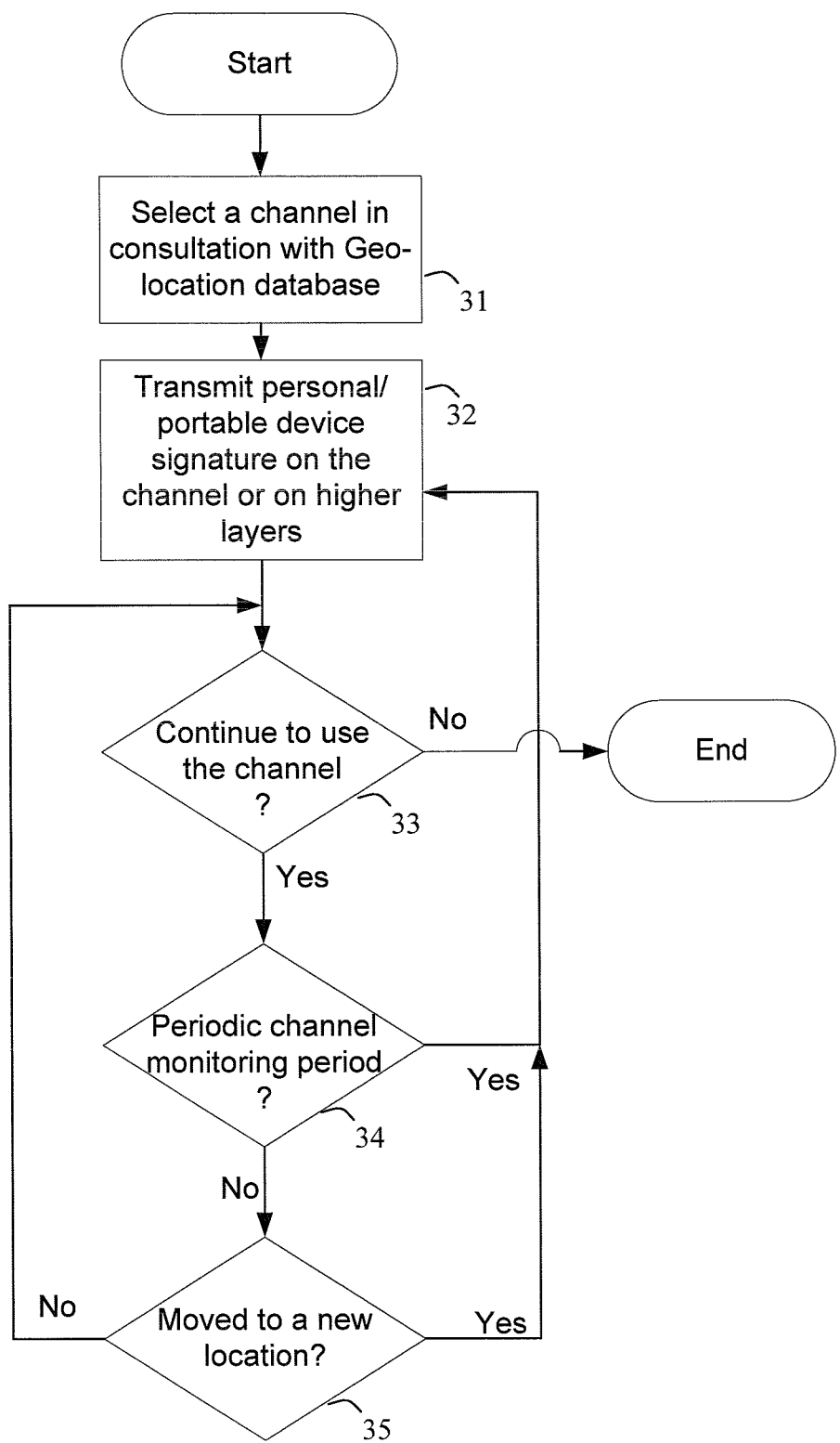
FIG. 3 illustrates a flowchart of processes for channel interference detection and prevention utilizing a personal/portable white space device in a network of wireless TV white space electronic devices, according to an embodiment of the invention.

FIG. 3 shows a flowchart of a process 30 implemented by a personal/portable white space device 11 capable of self-enablement (Mode-II), according to an embodiment of the invention. The process 30 includes the following process blocks:

Block 31: Select a channel in consultation with geolocation database.
Block 32: Transmit personal/portable device signature on the channel or on higher layers.
Block 33: Continuing need to use the channel? If yes, proceed to block 34, else End.
Block 34: Periodic channel monitoring period to periodically execute a function to determine if the device can continue using the channel. If no, proceed to block 35, else proceed to block 32.
Block 35: Moved to a new location? If no, proceed to block 33, else proceed to block 32.

Figure 4:
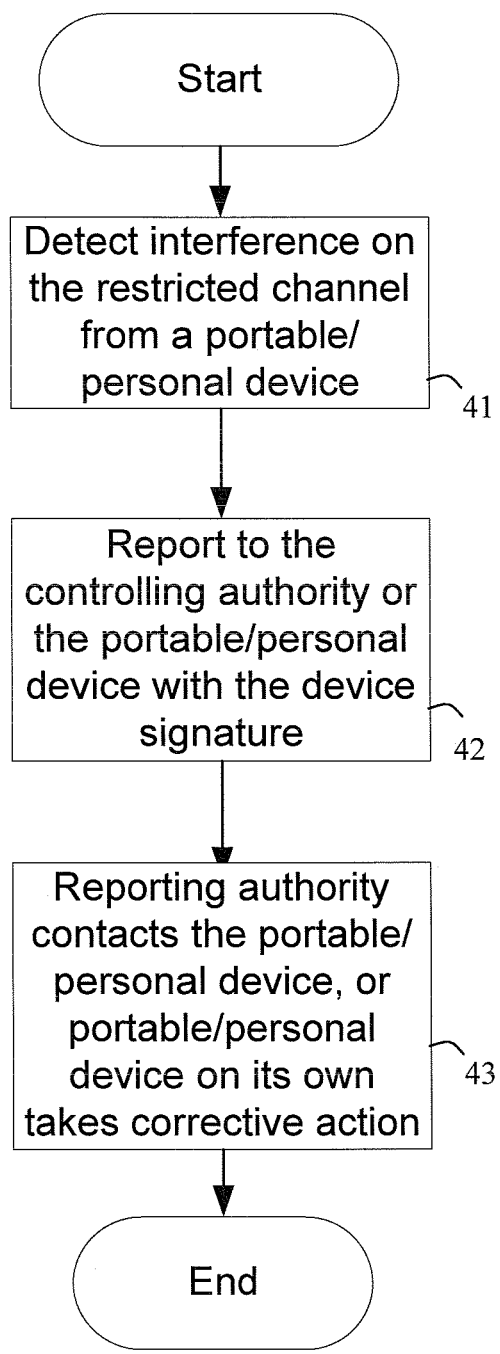
FIG. 4 illustrates a flowchart of processes for channel interference detection and prevention utilizing a primary/secondary white space device in a network of wireless TV white space electronic devices, according to an embodiment of the invention.

FIG. 4 shows a flowchart of a process 40 implemented by a primary/secondary device that receives interference on a restricted channel, according to an embodiment of the invention. The process 40 includes the following process blocks:

Block 41: Detect interference on the restricted channel by a personal/portable white space device 11 capable of self-enablement (Mode-II).
Block 42: Obtain device signature of the interfering personal/portable white space device 11 and report the interference to a controlling authority or to the interfering device itself.
Block 43: Upon receiving the report, the interfering personal/portable white space device 11 upon receiving the report goes off the restricted channel. Further, the reporting authority may contact the interfering personal/portable white space device 11 to take corrective action.

According to embodiments of the invention, a personal/portable TVWS device capable of self-enablement (Mode-II) transmits a unique device signature including an identifier, without any external support from any other TVWS personal portable (Mode-I and Mode-II) and/or fixed devices. The device identifier includes a combination of identifiers from Network/Internet Layer (layer 2) to Application Layer (layer 4) in the TCP/IP stack. Some device identifiers related to Transport Layer (layer 3) and above may be transmitted on layer 2 and above.

Embodiments of the invention enable protection of occupied channels when secondary devices that transmit a unique device identifier, such as personal/portable TVWS devices (e.g., mobile TVWS devices) capable of self-enablement (Mode-II), are present. Embodiments of the invention allow identifying such personal/portable devices that may create interference on a channel that should not be used by a secondary TVWS device. Embodiments of the invention further protect primary devices in the presence of such personal/portable devices.

Figure 5:
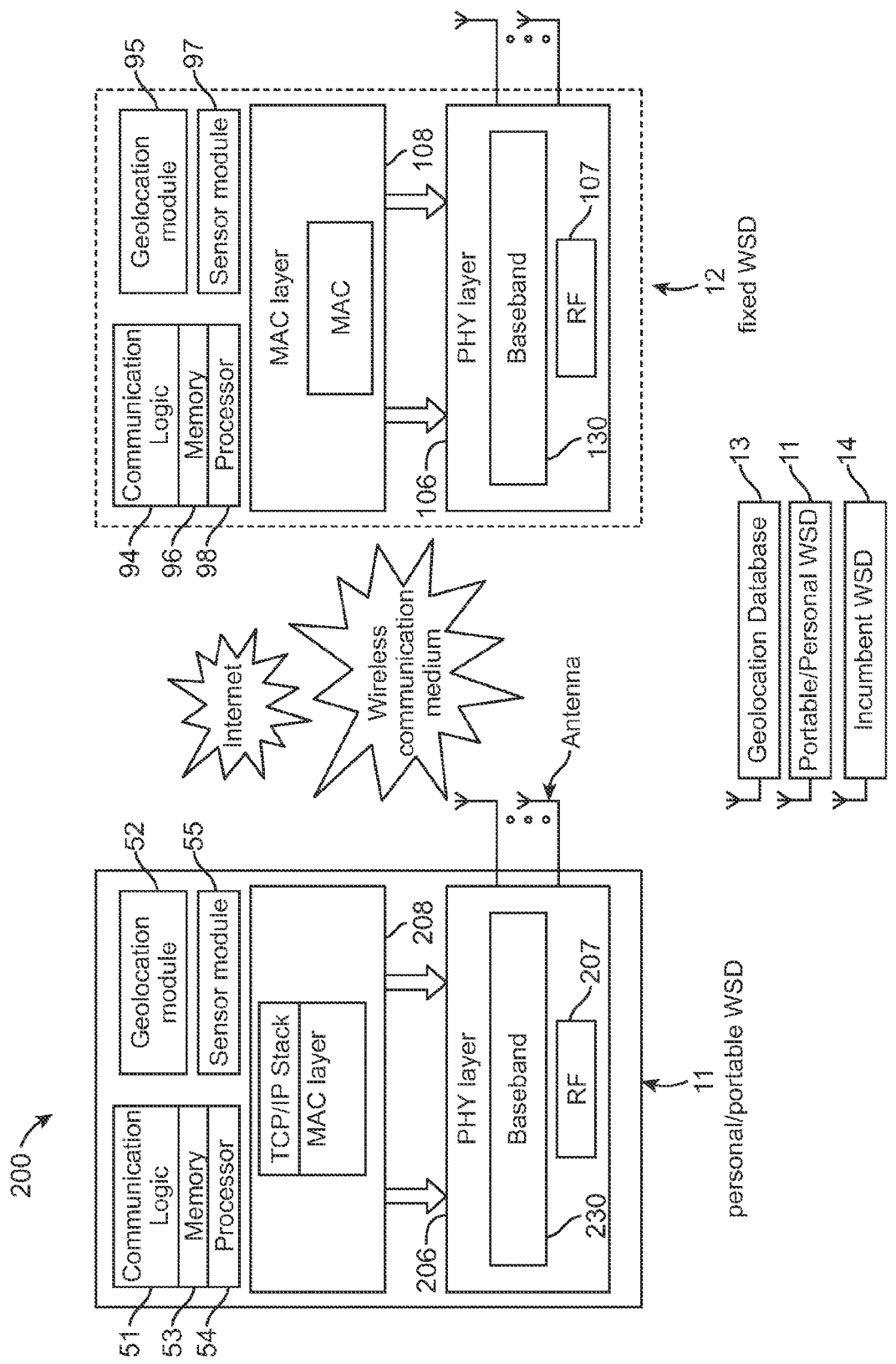
FIG. 5 shows a network of wireless TV white space electronic devices, implementing channel interference detection and prevention, according to an embodiment of the invention.

FIG. 5 shows a block diagram of a wireless communication system 200 an as example implementation of aspects of the network 10 in FIG. 1, according to an embodiment of the invention. The system 200 includes wireless white space devices (WSD) such as self-enabling personal/portable white space devices (Mode-II) 11 and a fixed WSD 12, a geolocation database 13 and an incumbent device 14, operating in TV White space spectrum.

Each device 11 includes a physical (PHY) layer 206, a TCP/IP stack and MAC layer 208, and communication logic 51 that implements functions including transmitting said unique device identifier, and ceasing channel interference upon being notified (e.g., process 30 in FIG. 3). The device 11 further comprises a geolocation module 52 for communicating with the geolocation database 13, a memory 53, a processor 54 and a sensor module 55 for spectrum sensing.

The PHY layer 206 includes a radio frequency (RF) communication module 207 which wirelessly transmits/receives signals under control of a baseband process module 230. The baseband module 230 allows communicating control information and data. The TCP/IP stack may further include an application layer for packetizing data, wherein data packets are then converted to MAC packets by the MAC layer.

According to embodiments of the invention, a personal/portable TVWS device 11 capable of self-enablement (Mode-II) transmits a unique device signature including an identifier. The device identifier includes a combination of identifiers from Network/Internet Layer (layer 2) to Application Layer (layer 4) in the TCP/IP stack. Certain device identifiers related to Transport Layer (layer 3) and above may be transmitted on Network/Internet Layer (layer 2) and above. Such a personal/portable TVWS device 11 capable of self-enablement can enable itself without any external support from any other TVWS personal portable (Mode-I and Mode-II) and/or fixed devices.

A Personal/Portable (Mode-I) WSD is similar in architecture to a Mode-II WSD device, without the need for a geolocation module.

According to an embodiment of the invention, a fixed WSD 12 is stackwise similar to a Mode-II WSD device (e.g., TCP/IP stack, MAC layer, etc.). In one example shown in FIG. 5, a fixed WSD 12 includes a PHY layer 106, a MAC layer 108, communication logic 94 implementing functions such as process 40 in FIG. 4, according to embodiments of the invention. The fixed WSD 12 further comprises a memory 96 and a hardware processor 98. The communication logic 94 may also be a component of the MAC layer 108. The fixed WSD 12 may further comprise a geolocation module 95 for communicating with the geolocation database as needed, and a sensor module 97 for spectrum sensing as needed. Fixed and portable devices may have similar stack.

The PHY layer 106 includes a radio frequency (RF) communication module 107 which wirelessly transmits/receives signals under control of a baseband process module 130. The baseband module 130 allows communicating control information and data. The MAC layer may further include an application layer for packetizing data, wherein data packets are then converted to MAC packets.

According to embodiments of the invention a WSD 12 (FIG. 1) may utilize a wireless or wireline link for communication with the geolocation database 13. Similarly, an incumbent device 14 may utilize a wireless or wireline link for communication with the geolocation database 13. Similarly, a Mode-II client device 11 may utilize a wireless or wireline link for communication with the geolocation database 13. The geolocation database comprises a device, such as a computer system, that utilizes a wireless and/or wireline link for communication. In general, a geolocation database provides identification of real-world geographic location of an object, such as a wireless station/device or an Internet-connected station/device. According to embodiments of the invention, master/client devices herein refer to TVWS enabling/dependent devices (not to be confused with IEEE 802.11 master/client devices).

Embodiments of the invention enable protection of occupied/restricted wireless channels when secondary devices that transmit a unique device identifier, such as personal/portable TVWS devices (e.g., mobile TVWS devices) capable of self-enablement (Mode-II), are present. Embodiments of the invention allow identifying such personal/portable devices that may create interference on a channel that should not be used by a secondary TVWS device. Embodiments of the invention further protect primary devices such as incumbent devices, in the presence of such personal/portable devices. The Federal Communications Commission (FCC) for the United States provides regulations with specific definitions for devices qualifying as master devices, wherein non-qualifying devices may function as client devices that need to be enabled/managed by a master device. As such, in one example, a master device and a client device may have hardware configurations as defined by the FCC (e.g., FCC document is FCC-08-260, and ruling in Appendix B, http://hraunfoss.fcc.gov/edocs_public/attachmatch/FCC-08-260A1.pdf, released Nov. 14, 2008). The present invention provides novel configurations and enhancements to such master and client devices for functionality according to the embodiments of the invention described herein. The present invention is further useful with other regulations for TVWS or similar bands, and/or regulations by other counties or entities corresponding to those by the FCC.

As is known to those skilled in the art, the aforementioned example architectures described above, according to the present invention, can be implemented in many ways, such as program instructions for execution by a hardware processor, as software modules, microcode, as computer program product on computer readable media, as analog circuits, logic circuits, electronic circuits, as application specific integrated circuits, as firmware, as consumer electronic devices, etc., in wireless devices, in wireless transmitters/receivers, in wireless networks, etc. Further, embodiments of the invention can take the form of an entirely hardware embodiment, an entirely software embodiment or an embodiment containing both hardware and software elements.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems.

Furthermore, the computer readable medium may comprise computer readable information in a transitory state medium such as a network link and/or a network interface, including a wired network or a wireless network, that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

Though the present invention has been described with reference to certain versions thereof; however, other versions are possible. Therefore, the spirit and scope of the appended claims should not be limited to the description of the preferred versions contained herein.

What is claimed is:

1. A method for determining wireless channel interference in a white space spectrum, comprising:
   sensing a signal on a wireless channel from a wireless white space device, wherein the signal comprises a hash function computed for a signature of the wireless white space device including a unique device identifier;
   determining interference by the wireless white space device on the wireless channel based on the signal; and
   generating a report of the channel interference by the wireless white space device, wherein the signature comprises a combination of geolocation information and system identifiers, wherein the geolocation information comprises geolocation authentication information.

2. The method of claim 1, wherein:
   the white space spectrum comprises television band white space spectrum (TVWS); and
   the wireless white space device comprises a TVWS personal/portable white space device.

3. The method of claim 2, wherein:
   generating a report of the channel interference by the wireless white space device further comprises generating a report of the channel interference including the unique device identifier.

4. The method of claim 3, wherein:
   generating a report of the channel interference further comprises informing the interfering wireless white space device of the interference, by contacting the interfering personal/portable white space device in-band on an operating channel or on layers above a data link layer in the Transmission Control Protocol/Internet Protocol (TCP/IP) model for layered communications and computer network protocol.

5. The method of claim 3, wherein:
generating a report of the channel interference further comprises informing an authority to inform the interfering wireless white space device to get off the wireless channel.

6. The method of claim 4, wherein:
the wireless white space device employs a module for geolocation database access and spectrum sensing.

7. The method of claim 6, further comprising:
transmitting information including the unique device identifier on a wireless channel by the wireless white space device;
wherein the unique device identifier comprises a combination of identifiers from multiple communication layers, and the geolocation information comprises authentication data obtained from a geolocation database.

8. The method of claim 7, wherein:
the wireless channel is a restricted channel, an occupied channel, or a restricted and an occupied channel; and
the wireless white space device periodically, or on-demand, transmits said device identifier uniquely identifying the wireless white space device.

9. The method of claim 7, further comprising:
periodically transmitting the unique device identifier by the wireless white space device based on information from the geolocation database, when the wireless white space device determines that its physical location has changed;
wherein the unique device identifier comprises a combination of three or more of the fields: geolocation information, Internet Protocol (IP) address, default gateway (GW) address and basic service set identifier.

10. The method of claim 9, wherein:
one or more fields of the device identifier are transmitted on one or more of: IP-layer, Transport layer, Application layer of the wireless white space device.

11. The method of claim 1, wherein:
the unique device identifier is transmitted multiple times on narrowband in the wireless channel.

12. The method of claim 1, further comprising:
after claiming a channel during a channel claiming period, the wireless white space device registering its device identifier with a fixed wireless white space device or other authorized entity; and
computing a hash value of fixed length bits over the device identifier and the wireless white space device transmitting the hash value instead of transmitting the full device identifier, wherein the wireless white space device is capable of self-enablement (Mode-II).

13. The method of claim 12, further comprising:
transmitting a tuple including said hash value, the device identifier of said fixed wireless white space device or authorized entity as: {hash, device identifier, fixed wireless white space device or authorized entity id} by the wireless white space device capable of self-enablement (Mode-II).

14. The method of claim 13, further comprising:
the wireless white space device independently computing the hash value based on an agreed upon hashing function.

15. The method of claim 12 further comprising:
transmitting a device identifier periodically or on-demand by a personal/portable wireless white space device (Mode-I) enabled by a personal/portable wireless white space device capable of self-enablement (Mode-II) or by a fixed wireless white space device.

16. The method of claim 15, further comprising:
a personal/portable wireless white space device (Mode-I) that is incapable of populating geolocation and other higher layer fields in its device identifier, populating said fields using corresponding information from the device identifier of its enabling wireless white space device.

17. The method of claim 1, wherein the signature comprises a combination of geolocation information and system identifiers including identifiers from three or more communication layers comprising a link layer, a network/Internet layer, a transport layer and an application layer.

18. The method of claim 17, wherein the combination of system identifiers comprises three or more of a media access control (MAC) address, wireless channel number, service set identifier, default domain name system (DNS), subnet mask and Internet Protocol (IP), default gateway and port number.

19. The method of claim 1, wherein the system identifiers include one or more of a basic service set identifier (BSSID) and SSID of the wireless white space device.

20. The method of claim 1, wherein the geolocation authentication information comprises geolocation authentication code.

21. A wireless white space device, comprising:
a communication module configured for transmitting a unique device identifier on a wireless channel for uniquely identifying the white space device upon channel interference by the white space device in a white space spectrum; and
a geolocation module configured for accessing a geolocation database,
wherein the wireless white space device comprises a personal/portable white space device capable of self-enablement, that transmits a hash computed on a signature of the white space device and the unique device identifier, and accesses the geolocation database without using any other white space device, wherein the signature comprises a combination of geolocation information and system identifiers, wherein the geolocation information comprises geolocation authentication information.

22. The wireless white space device of claim 21, wherein:
the unique device identifier comprises a combination of identifiers from multiple communication layers and geolocation data.

23. The wireless white space device of claim 22, wherein:
the white space spectrum comprises television band white space spectrum (TVWS); and
the wireless white space device comprises a TVWS personal/portable white space device.

24. The wireless white space device of claim 23, wherein:
the wireless white space device employs self-access of the geolocation database and spectrum sensing.

25. The wireless white space device of claim 24, wherein:
the wireless channel is a restricted and/or occupied channel; and
the wireless white space device is configured for periodically, or on-demand, transmitting said unique device identifier identifying the wireless white space device.

26. The wireless white space device of claim 24, wherein:
the communication module is configured for periodically transmitting the unique device identifier based on information from the geolocation database, when the geolocation module determines that physical location has changed; and
the unique device identifier comprises a combination of three or more of fields:
geolocation information, Internet Protocol (IP) address, default gateway (GW) address and basic service set identifier.

27. The wireless white space device of claim 26, wherein:
one or more fields of the device identifier are transmitted on one or more of: IP-layer, Transport layer, Application layer of the wireless white space device.

28. The wireless white space device of claim 21, wherein:
the device identifier is transmitted multiple times on narrowband in the channel.

29. The wireless white space device of claim 21, wherein:
after claiming a channel during a channel claiming period, the wireless white space device capable of self-enablement (Mode-II) registers its device identifier with a fixed wireless white space device or other authorized entity, and computes a hash value of fixed length bits over the device identifier and transmits the hash value instead of transmitting the full device identifier.

30. The wireless white space device of claim 29, wherein:
the wireless white space device capable of self-enablement (Mode-II) transmits a tuple including said hash value, the device identifier of said fixed wireless white space device or authorized entity as: {hash, device identifier, fixed wireless white space device or authorized entity id}.

31. The wireless white space device of claim 30, wherein:
the wireless white space device independently computes a hash value based on an agreed upon hashing function.

32. A wireless communication system, comprising:
a personal/portable wireless white space device, comprising a communication module configured for transmitting a unique device identifier on a wireless channel for uniquely identifying the white space device upon channel interference by the white space device in a white space spectrum, and a geolocation module configured for accessing a geolocation database, wherein the personal/portable white space device is capable of self-enablement, transmitting a hash over a signature of the white space device and the unique device identifier, and accessing the geolocation database without using any other white space device; and
a wireless device configured for sensing a signal on a wireless channel from a personal/portable wireless white space device that transmits a unique device identifier, and upon determining interference by the personal/portable wireless white space device on the wireless channel, generating a report of the channel interference by the personal/portable wireless white space device,
wherein the signature comprises a combination of geolocation information and system identifiers, wherein the geolocation information comprises geolocation authentication information.

33. The system of claim 32, wherein:
the unique device identifier comprises a combination of identifiers from multiple communication layers and geolocation data.

34. The system of claim 33, wherein:
the white space spectrum comprises television band white space spectrum (TVWS);
the personal/portable wireless white space device comprises a TVWS personal/portable white space device;
the personal/portable wireless white space device employs self-access of the geolocation database and spectrum sensing; and
the geolocation information comprises geolocation authentication data.

35. The system of claim 34, wherein:
the wireless channel is a restricted and/or occupied channel; and
the personal/portable wireless white space device is configured for periodically, or on-demand, transmitting said device identifier uniquely identifying the wireless white space device.

36. The system of claim 35, wherein:
the communication module is configured for periodically transmitting the unique device identifier when based on information from the geolocation database, the geolocation module determines that physical location has changed; and
the unique device identifier comprises a combination of three or more of: geolocation information, Internet Protocol (IP) address, default gateway (GW) address and basic service set identifier.

37. The system of claim 36, wherein:
one or more fields of the device identifier are transmitted on one or more of: IP-layer, Transport layer, Application layer of the personal/portable wireless white space device.

38. The system of claim 36, wherein:
the device identifier is transmitted multiple times on narrowband in the wireless channel.

39. The system of claim 36, wherein:
after claiming a channel during a channel claiming period, the personal/portable wireless white space device capable of self-enablement (Mode-II) registers its device identifier with a fixed wireless white space device or other authorized entity, and computes a hash value of fixed length bits over the device identifier and transmits the hash value instead of transmitting the full device identifier.

40. The system of claim 39, wherein:
the wireless white space device capable of self-enablement (Mode-II) transmits a tuple including said hash value, the device identifier of said fixed wireless white space device or authorized entity as: {hash, device identifier, fixed wireless white space device or authorized entity id}.

41. The system of claim 40, wherein:
the wireless white space device independently computes a hash value based on an agreed upon hashing function.

42. The system of claim 36, wherein:
the wireless device comprises a white space wireless device further configured for generating a report of the channel interference by informing the interfering personal/portable wireless white space device of the interference, by contacting the interfering personal/portable white space device in-band on an operating channel or on layers above a data link layer in the Transmission Control Protocol/Internet Protocol (TCP/IP) model for layered communications and computer network protocol.

43. A method for determining wireless channel interference in a white space spectrum, comprising:
sensing a signal on a wireless channel from a wireless white space device, wherein the signal comprises a unique device identifier;
determining interference by the wireless white space device on the wireless channel based on the signal;
generating a report of the channel interference by the wireless white space device; and
computing a hash value on a signature of the wireless white space device that includes the unique device identifier independently by the wireless white space device based on an agreed upon hashing function, wherein the signature comprises a combination of geolocation information and system identifiers, wherein the geolocation information comprises geolocation authentication information.

44. The method of claim 43, further comprising:
the wireless white space device capable of self-enablement (Mode-II) transmitting a tuple including said hash value.

* * * * *